US008624604B2

(12) United States Patent
Heyworth et al.

(10) Patent No.: US 8,624,604 B2
(45) Date of Patent: Jan. 7, 2014

(54) CLEARANCE AND WEAR DETERMINATION APPARATUS

(75) Inventors: Harold Heyworth, Loughborough (GB); James P. Roberts, Derby (GB)

(73) Assignee: Rolls-Royce PLC, London (GB)

( * ) Notice: Subject to any disclaimer, the term of this patent is extended or adjusted under 35 U.S.C. 154(b) by 514 days.

(21) Appl. No.: 13/058,140

(22) PCT Filed: Jul. 30, 2009

(86) PCT No.: PCT/EP2009/005518
§ 371 (c)(1), (2), (4) Date: Feb. 8, 2011

(87) PCT Pub. No.: WO2010/017893
PCT Pub. Date: Feb. 18, 2010

(65) Prior Publication Data
US 2011/0194122 A1    Aug. 11, 2011

(30) Foreign Application Priority Data
Aug. 15, 2008  (GB) .................................. 0814877.7

(51) Int. Cl.
G01R 27/04 (2006.01)
(52) U.S. Cl.
USPC .......................................... 324/637; 324/635
(58) Field of Classification Search
USPC ....................................................... 324/637
See application file for complete search history.

(56) References Cited

U.S. PATENT DOCUMENTS

| | | | | |
|---|---|---|---|---|
| 4,813,273 A | * | 3/1989 | Parsons | ........................ 73/112.01 |
| 5,140,494 A | * | 8/1992 | Slade | ............................. 361/212 |
| 5,552,711 A | * | 9/1996 | Deegan et al. | ................. 324/464 |
| 5,557,099 A | | 9/1996 | Zielinski et al. | |
| 5,818,242 A | * | 10/1998 | Grzybowski et al. | ......... 324/642 |
| 6,856,281 B2 | | 2/2005 | Billington et al. | |
| 7,095,221 B2 | * | 8/2006 | Bosselmann et al. | ......... 324/71.1 |
| 8,449,255 B2 | * | 5/2013 | Tadayon et al. | .................. 416/37 |

FOREIGN PATENT DOCUMENTS

| | | |
|---|---|---|
| DE | 10 2007 009 739 A1 | 9/2008 |
| EP | 0 806 680 A2 | 11/1997 |
| EP | 1 445 577 A1 | 8/2004 |
| GB | 2 065 410 A | 6/1981 |
| GB | 2 427 683 A | 1/2007 |
| WO | WO 2008/040601 A1 | 4/2008 |

OTHER PUBLICATIONS

Willsch et al., "New approaches for the monitoring of gas turbine blades and vanes," Proceedings of IEEE Vienna, 2004, pp. 20-23.
International Search Report for International Patent Application No. PCT/EP2009/005518, mailed on Sep. 30, 2009.
Written Opinion for International Patent Application No. PCT/EP2009/005518, mailed on Sep. 30, 2009.
Search Report for corresponding British Patent Application No. 0814877.7, dated Dec. 4, 2008.

* cited by examiner

Primary Examiner — Thomas F Valone
(74) Attorney, Agent, or Firm — Oliff & Berridge, PLC

(57) ABSTRACT

Apparatus is provided for determining the clearance between a member and a casing surface over and relative to which the member moves, e.g. in a gas turbine engine. The apparatus includes a main waveguide and a reference element that is provided at a position intermediate the proximal and distal ends, or at the distal end, of the waveguide. The transmitter/receiver is arranged to transmit an electromagnetic signal through the main waveguide and receive (i) a first portion of the electromagnetic signal reflected from the reference element, (ii) a second portion of the electromagnetic signal reflected from the casing surface, and (iii) a third portion of the electromagnetic signal reflected from the member, allowing the relative positioning of the reference element, the casing surface and the member to be simultaneously determined.

20 Claims, 2 Drawing Sheets

CLEARANCE AND WEAR DETERMINATION APPARATUS

The present invention relates to a device for determining the clearance between a member and a surface over and relative to which the member moves. Particularly, but not necessarily exclusively, the device can be used for determining the gas path clearance between a rotor blade tip and the engine casing of a gas turbine engine.

In a gas turbine engine, reducing the gas path clearance increases the efficiency that can be achieved with the engine. However, the dimensions of the engine components, particularly the lengths of the rotor blades, and the positioning of these engine components, can alter during operating of the engine. This can cause the tips of the rotor blades to rub against the casing. To accommodate this rubbing, either the casing comprises an abraidable outer liner and/or the blade tips are designed to wear. The liner reduces in thickness and/or the blade reduces in length when the rubbing occurs. This can lead to temporary or permanent changes in the amount of clearance between the blades and the casing surface, reducing engine efficiency.

In view of the above, it is generally desirable to monitor the clearance between the blade tip and the casing, to ensure that the engine operates optimally. To do this, it is known to use clearance sensors that employ, for example, capacitance, microwave or optical technology. For example, a capacitance probe is located in a recess provided in the casing and detects the distance between the probe and the tip. The probe is placed in the recess to prevent it being damaged by the moving tip. The gas path clearance can be determined from the distance between the probe and the tip, and a pre-existing knowledge of the probe positioning relative to the casing surface. However, using this approach, the true clearance between the tip and the casing surface is not actually measured. The measured value may therefore be erroneous, because any change in the thickness of the casing surface caused by rubbing of the surface by the rotor blades is not taken into account. Furthermore, such capacitance systems are susceptible to contamination due to wear and air borne debris entering the recess, and the high temperature operating environment can mean expensive materials are required to protect the capacitance probe from damage.

In an attempt to solve problems described above, U.S. Pat. No. 5,818,242 discloses a microwave clearance sensor that is located in a recess in the casing and which is arranged to measure two parameters. The distance between the sensor and the blade tip is determined by established/well known analysis of the probe output as a blade passes the probe. Additionally, the probe output, at times when no blade is close to the probe, is analysed to detect changes in the effect of the lining on the probe output due to changes in the lining thickness. The clearance from the probe to blade, and calculated lining thickness, are then used to determine the distance between the blade and the casing.

However, the arrangement requires the sensor to be located proximate the casing surface for precise distance measurement. This can cause manufacturing difficulties as it may require the sensor to fit in a standard recess that is designed for capacitance probes. Furthermore, the sensor does not measure the true thickness of the liner. Rather, it provides for calculation of the liner thickness based on pre-existing knowledge of the original thickness and electromagnetic properties of the liner and the measured effect of a reduction in thickness on probe output, making erroneous measurement a possibility. The technique is only suitable for applications to discontinuous surfaces, so that the lining measurement can be taken in the absence of passing components. It is therefore unsuitable for continuous surfaces such as shrouded gas turbine rotors and brake disks. Also, the recess, and therefore the sensor, is prone to contamination and heat damage.

A first aspect of the present invention provides apparatus for determining the clearance between a member and a casing surface over and relative to which the member moves, comprising:

a main waveguide, the waveguide having a proximal end and a distal end, the distal end being adjacent the casing surface and the proximal end being at a position recessed in the casing, a transmitter/receiver, provided at the proximal end of the main waveguide, a reference element at a position intermediate the proximal and distal ends of the waveguide or at the distal end of the waveguide, wherein the transmitter/receiver is arranged to transmit an electromagnetic signal through the main waveguide and receive:

(i) a first portion of the electromagnetic signal reflected from the reference element, (ii) a second portion of the electromagnetic signal reflected from the casing surface, and (iii) a third portion of the electromagnetic signal reflected from the member.

The first, second and third signal portions allow the relative positioning of the reference element, the casing surface and the member to be simultaneously determined. To determine the positioning, standard signal/distance measuring techniques may be used, such as interferometry or time of flight measurement (time domain reflectometry (TDR)), which use the relative phase and/or timing of the signal portions to determine the relative positioning of the various elements.

By simultaneously determining the relative positioning of the casing surface and the member from the second and third portions of the electromagnetic signal respectively, the true clearance between the member and the casing surface can be calculated, with any movement in the positioning of the casing surface, caused by possible rubbing of the member on the surface, being taken into account in the calculation. Furthermore, since the reference element provides a fixed reference point with respect to the casing against which the position of the member can be compared, by monitoring the relative positioning of the reference element and the casing, determined from the first and third reflected portions respectively, any shift in the actual position of the member relative to the casing can be calculated independently of any movement and/or wear of the casing surface.

By using the reference element as the reference point for the casing, rather than the transmitter/receiver itself, the transmitter/receiver need not be fixed relative to the casing, and may be positioned at a more desirable location, e.g. a position where there is more space. Furthermore, the arrangement means that any movement of the transmitter/receiver relative to the casing, e.g. as a result the transmitter/receiver being taken away for testing, or repairs etc., will not affect the accuracy of the measurements. No re-calibration of the positioning of the transmitter/receiver relative to the casing is necessary in such circumstances, since the reference element acts as the casing reference point. In contrast to the transmitter/receiver, the reference element may be a relatively simple element meaning movement from its fixed position, e.g. for repair, is unlikely to be necessary.

The casing may comprise a liner, the outer surface of the liner providing the casing surface. The liner may be abraidable. The liner may provide a heat shield for the casing. The liner may cover a distal end opening of the waveguide and provide a heat shield to the waveguide and/or transmitter/receiver. Furthermore, the liner may prevent contamination of the waveguide and/or transmitter/receiver. By being abraidable, the liner may provide a sacrificial portion of the casing, which is abraided when contacted by the member, avoiding excessive heat build-up or damage of the casing.

Since the inner surface of the liner, at the distal end of the waveguide, may be fixed in relation to the rest of the casing, it may provide the reference element. However, preferably, a reference element separate from the liner, intermediate the proximal and distal ends of the casing, is provided.

Preferably, the apparatus can be used to calculate the thickness of the liner. When the inner surface of the liner provides the reference element, the thickness of the liner may be determined by comparing the positioning of the reference element and the casing surface (i.e. the outer surface of the liner), obtained from the first and second portions of the electromagnetic signal respectively. However, when the reference element is separate from the inner surface of the liner, the transmitter/receiver may be arranged to receive a fourth portion of the electromagnetic signal reflected from the inner surface of the liner, the thickness being calculated by comparing the positioning of the casing surface (i.e. the outer surface of the liner) and the inner surface of the liner obtained from the second and fourth portions of the electromagnetic signal respectively.

Preferably, electromagnetic signal is a microwave signal. The microwaves may be emitted from a source such as a Gunn diode. As alternatives, the electromagnetic signal may be an infrared, visible light (optical) or ultraviolet signal. By using visible light for example, the transmitter/receiver unit may be scaled down and, since visible light has a higher frequency and lower wavelength than microwaves, more precise distance measurement may be achieved.

The transmitter and receiver may be integrated into the same transmitter/receiver unit, or may be separate.

The reference element may be provided by an impedance discontinuity at an interface between different materials, a change in width of the main waveguide, a change in the extension direction of the main waveguide, or an appropriate alternative.

Preferably, the apparatus comprises a reference waveguide to enable detection of, and compensation for, any changes in length of the main waveguide. The length of the main waveguide may change due to thermal effects, mechanical strain, pressure variations and other influences. This can lead to errors in the calculations of clearance, liner thickness etc., discussed above. By detecting the change in length of the reference waveguide, which may be similar or identical to the main waveguide, a corresponding change in length of the main waveguide can be estimated and factored into the calculations, reducing or eliminating error in the calculations. The electromagnetic signal may be split between the main waveguide and the reference waveguide, and the transmitter/receiver may be arranged to receive a fifth portion of the electromagnetic signal that reflects from a distal end of the reference waveguide, allowing any change in length of the waveguide to be determined.

Preferably, the apparatus is used in a jet engine, e.g. a gas turbine engine, the member being a rotor blade. Accordingly, amongst other things, the apparatus may be used to calculate and monitor rotor blade wear or creep, rotor path lining erosion and wear, and gas path clearance between the rotor blade tip and the engine casing surface, which are important factors in relation to engine efficiency.

Nonetheless, the apparatus may be applied in other fields where monitoring of the clearance between a member and a casing surface over and relative to which the member moves is important. A non-exhaustive list of applications include: braking discs in cars, trains and airplanes; rotating discs in machine tools; engine cylinders; underwater monitoring of corrosion or erosion; bearings; steam turbines, and sliding shafts.

Embodiments of the invention will now be described by way of example with reference to the accompanying drawings in which.

Figure 1:
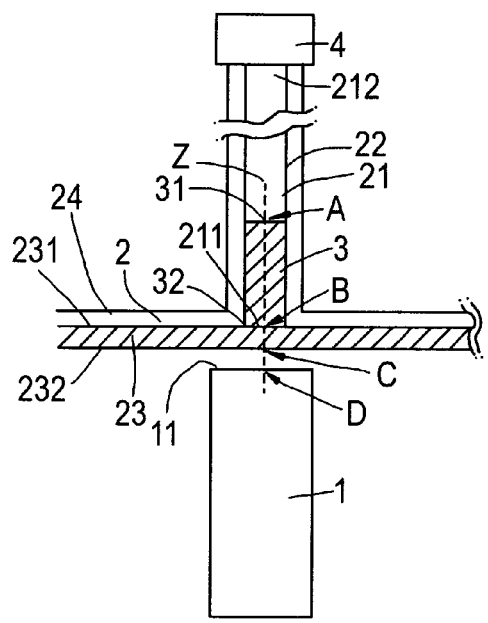
FIG. 1 shows a cross-sectional view of apparatus according to a first embodiment of the present invention.

Apparatus according to a first embodiment of the present invention is shown in FIG. 1. The apparatus comprises a rotor blade 1 located within an engine casing 2 of a gas turbine engine. The rotor blade 1 is arranged to rotate such that a tip 11 of the rotor blade 1 passes over a portion of the casing 2 where a waveguide 21 is provided in a recess 22 of the casing 2.

The casing 2 comprises an abraidable liner 23 and a rigid section 24. An inner surface 231 of the abraidable liner is coupled with the rigid section 24. An outer surface 232 of the liner provides the surface of the casing 2.

The waveguide 21 has a distal end opening 211 provided by an orifice in the rigid portion of the casing 2, and the waveguide 21 extends from the distal end opening 211, away from the rotor blade 1, to a proximal end opening 212. The liner 23 is arranged to cover the distal end opening 211.

In the first embodiment, a distal end region of the waveguide 21, adjacent the distal end opening 211, is filled with a first material 3 that is matched to the material of the liner 23 in mechanical and electrical properties. The first material 3 may be a dielectric material such as Magnesium Spinel. The remainder of the waveguide in this embodiment is air-filled.

Coupled with the proximal end opening 212 is a transmitter/receiver 4 (a probe). The transmitter/receiver is arranged to transmit a microwave signal into the waveguide 21 via the proximal end opening 212. The transmitter/receiver 4 may be coupled with the waveguide directly as shown, or indirectly (e.g. via a cable).

The first material 3 and the liner 23 may prevent contamination of the waveguide 21 and transmitter/receiver 4 by preventing particle ingress into the waveguide 21 via the distal end opening 211. Furthermore, the first material 3 and the liner 23 may act as a heat shield for the transmitter/receiver 4, placing the transmitter/receiver 4 in a low temperature environment.

The transmitted signal travels through the waveguide 21 and portions of the signal are caused to reflect back to the transmitter/receiver 4 from different positions along the waveguide 21 and beyond.

In more detail, as result of the impedance mismatch at the interface 31 between the air and the proximal end of the first material 3, one portion of the signal is reflected from the interface 31 back to the transmitter/receiver 4. This interface can therefore be considered a reference element for the casing 2. Referring to FIG. 1, the reflection takes place at point A along an imaginary straight line Z that extends from the reference element, through the distal end region of the waveguide 21 to the tip 11 of the rotor blade 1.

Another portion of the signal is reflected from the interface 32 between the distal end of the first material 3 and the inner surface 231 of the liner 23, at a point B along the line Z. The reflection is as a result of the impedance mismatch resulting from the transition between the relatively narrow first material 3 within the waveguide 21 and the relatively wide material of the liner 23.

Another portion of the signal is reflected from the interface between the outer surface 232 of the liner 23 and the adjacent air, at point C along line Z. The impedance mismatch results from the transition between the liner material 23 and the air at this interface, similar to the reflection at point A discussed above.

Yet another portion of the signal is reflected from the tip 11 of the rotor blade 1 at a point D along line Z. For a metallic blade, the reflected portion will be a total reflection of any signal remaining after the reflections at points A, B and C, since the metal of the blade acting will act as a mirror to the microwaves. However, for a ceramic or ceramic coated rotor blade, the reflection will be due to a change in impedance at the transition between the air/gas and the ceramic.

The four signal portions reflected at points A, B, C and D respectively are received by the transmitter/receiver 4. A signal processing means is associated with the transmitter/receiver and is arranged to determine the relative positioning of points A, B, C and D from the reflected signal portions using standard techniques such as interferometry or time of flight measurement (time domain reflectometry (TDR)), which compares the phase and/or timing of the reflected signal portions to determine the relative distances between points A, B, C and D.

By determining the relative positioning of points A, B, C, and D, the relative positioning of various components can be calculated. In more detail, the distance between the rotor blade tip 11 and the outer surface 232 of the lining 23 (i.e. the tip clearance) can be determined from the distance between points C and D. The thickness of the liner 23 can be determined from the distance between points B and C, or based on a pre-existing knowledge of the thickness of the liner 23 and the monitoring of any change in the distance between points A and C. Any changes in the rotor blade tip 11 positioning as it passes the waveguide 21, e.g. as a result of a change in blade length due to creep, or shifting of the blade mounting, can be determined by monitoring any change in the distance between points A and D. As an alternative, since point B is a position which also may be fixed relative to casing 2 (and may therefore also provide a fixed reference element for the casing 2), changes in positioning of the rotor blade tip 11 relative to the casing 2 may be determined by monitoring any changes in the distance between points B and D. Monitoring of changes in the blade tip 11 positioning is preferably performed at engine start or at another repeatable environmental condition.

Figure 2:
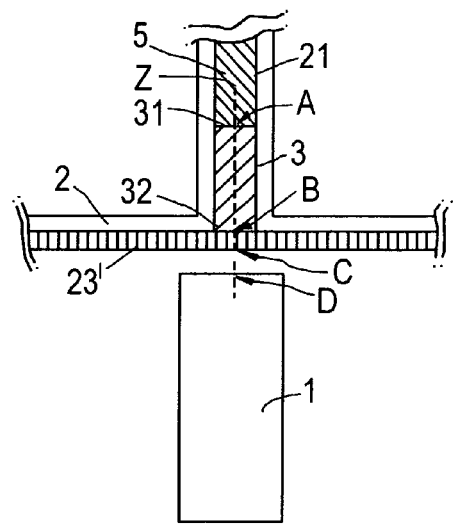
FIG. 2 shows a cross-sectional view of apparatus according to a second embodiment of the present invention.

Apparatus according to a second embodiment of the present invention is shown in FIG. 2. The apparatus of the second embodiment is substantially the same as the apparatus of the first embodiment. However, instead of the waveguide 21 being filled with air adjacent the proximal end 31 of the first material 3 at point A, the waveguide 21 is filled with a second material 5, which has impedance mismatch with the first material 3. In this embodiment, the material of the liner 23' is also different from the first material 3; in particular, it has an impedance mismatch with the first material 3, enhancing reflections at point B.

Figure 3:
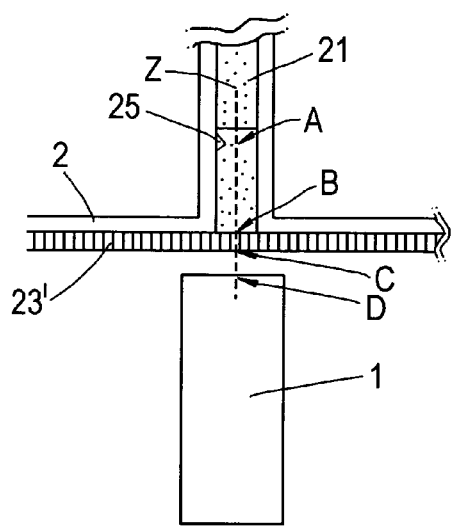
FIG. 3 shows a cross-sectional view of apparatus according to a third embodiment of the present invention.

Apparatus according to a third embodiment of the present invention is shown in FIG. 3. The apparatus of the third embodiment is substantially the same as the apparatus of the second embodiment. However, instead of having first and second materials 3, 5 in the waveguide 21 providing, by way of their interface, a reference element at point A, a protrusion 25 on an inner wall of the waveguide 21 is provided at point A. The protrusion reduces the width of the waveguide 21, causing a change in impedance and providing for partial reflection of the microwave signal at point A.

Figure 4:
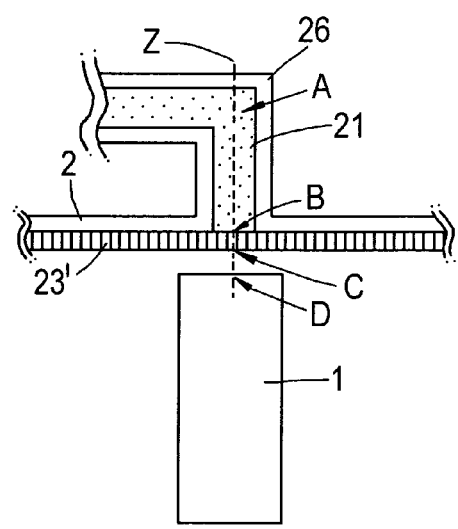
FIG. 4 shows a cross-sectional view of apparatus according to a fourth embodiment of the present invention.

Apparatus according to a fourth embodiment of the present invention is shown in FIG. 4. The apparatus of the fourth embodiment is similar to the apparatus of the previous embodiments. However, instead of a protrusion or different materials providing the impedance mismatch at point A, a change in the direction of extension of the waveguide 21 (a right angled bend 26) has been introduced at point A. This provides a 'lower profile' waveguide.

Figure 5:
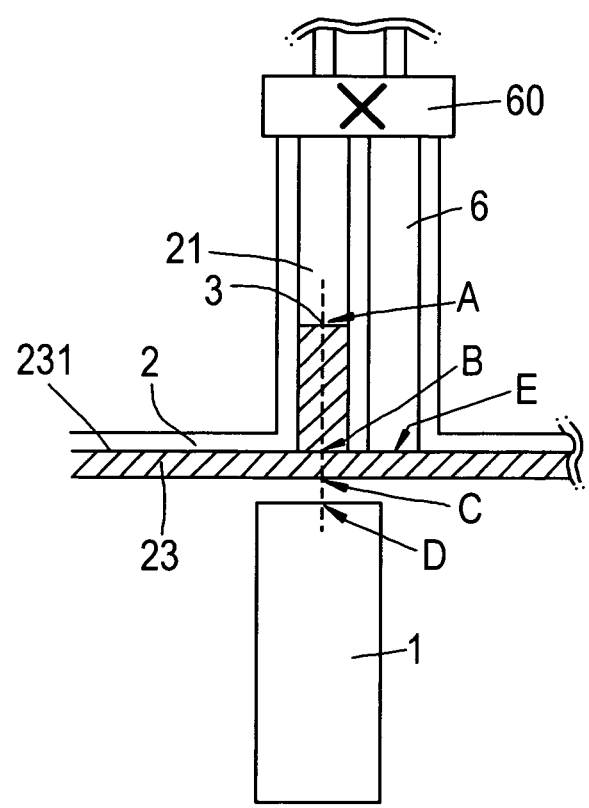
FIG. 5 shows a cross-sectional view of apparatus according to a fifth embodiment of the present invention.

A fifth embodiment of the present invention is shown FIG. 5. The apparatus of the fifth embodiment is substantially the same as the apparatus of the first embodiment of the invention. However, an additional recess is provided in the casing, which provides a reference waveguide 6 which has the same size and shape as the waveguide 21. By detecting the change in length of the reference waveguide 6, which can occur due to thermal effects, pressure variations etc., a corresponding change in length of the 'main' waveguide 21 can be can be determined and factored into the positioning calculations discussed above, reducing or eliminating error in these calculations.

To monitor the change in length of the reference waveguide 6, the microwave signal travelling from the transmitter/receiver is split by a splitter/mixer 60, causing one part of the microwave signal to travel into the main waveguide 21 and another part to travel into the reference waveguide 6. The portion of the microwave signal travelling into the reference waveguide 6 reflects off the inner surface 231 of the liner 23 (defining the end of the waveguide 6) at point E, back to the splitter/mixer, where it is combined with the reflected signal portions from the main waveguide 21 and travels back to the transmitter/receiver 4. By monitoring the reflected signal portion from point E using the signal processing means associated with the transmitter/receiver, the length and/or any change in length of the reference waveguide can be determined.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. Apparatus for determining the clearance between a member and a casing surface over and relative to which the member moves, comprising:
   a main waveguide, the waveguide having a proximal end and a distal end, the distal end being adjacent the casing surface and the proximal end being at a position recessed in the casing;
   a transmitter/receiver, provided at the proximal end of the main waveguide, and
   a reference element at a position intermediate the proximal and distal ends of the waveguide or at the distal end of the waveguide;

wherein the transmitter receiver is arranged to transmit an electromagnetic signal through the main waveguide and receive:
(i) a first portion of the electromagnetic signal reflected from the reference element;
(ii) a second portion of the electromagnetic signal reflected from the casing surface, and
(iii) a third portion of the electromagnetic signal reflected from the member.

2. The apparatus of claim 1, wherein the casing comprises a liner, the outer surface of the liner providing the casing surface.

3. The apparatus of claim 2, wherein the liner covers an opening at the distal end of the main waveguide.

4. The apparatus of claim 2, wherein the reference element is provided by the inner surface of the liner.

5. The apparatus of claim 1, wherein the reference element is intermediate the proximal and distal ends of the waveguide.

6. The apparatus of claim 5, wherein the transmitter is arranged to receive a fourth portion of the electromagnetic signal reflected from the inner surface of the liner.

7. The apparatus of claim 5, wherein the reference element is provided by an interface between different materials in the main waveguide.

8. The apparatus of claim 5, wherein the reference element is provided by a change in width of the main waveguide.

9. The apparatus of claim 5, wherein the reference element is provided by a change in the direction of extension of the main waveguide.

10. The apparatus of claim 1, wherein the electromagnetic signal is a microwave signal.

11. The apparatus of claim 1, wherein the electromagnetic signal is a visible or ultraviolet light signal.

12. The apparatus of claim 1, wherein a reference waveguide having a proximal end and a distal end is provided, adjacent the main waveguide, for determining any change in length of the main waveguide.

13. The apparatus of claim 12, wherein the reference waveguide is the same length as the main waveguide.

14. The apparatus of claim 12, wherein the transmitter/receiver is arranged to receive a fifth portion of the electromagnetic signal reflected from the distal end of the reference waveguide.

15. The apparatus of claim 1, comprising a signal processing means connected to the transmitter/receiver.

16. The apparatus of claim 15, wherein the signal processing means is arranged to determine the relative positioning of the casing surface and the member, from the second and third portions of the electromagnetic signal, to calculate the clearance between the casing surface and the member.

17. The apparatus of claim 15, wherein the signal processing means is arranged to determine the relative positioning of the reference element and the casing surface, from the first and second portions of the electromagnetic signal, to calculate the thickness of the liner.

18. The apparatus of claim 15, wherein the signal processing means is arranged to determine the relative positioning of the casing surface and the inner surface of the liner, from the second and fourth portions of the electromagnetic signal, to calculate the thickness of the liner.

19. The apparatus of claim 15, wherein the signal processing means is arranged to determine the relative positioning of the reference element and the member, from the first and third portions of the electromagnetic signal, to calculate any changes in the positioning of the member relative to the casing.

20. The apparatus of claim 15, wherein the signal processing means is arranged to determine the relative positioning of the member and the inner surface of the liner, from the third and fourth portions of the electromagnetic signal, to calculate any changes in the positioning of the member relative to the casing.

* * * * *